(12) United States Patent
Stanko et al.

(10) Patent No.: US 6,360,992 B1
(45) Date of Patent: Mar. 26, 2002

(54) HYBRID DEICING SYSTEM AND METHOD OF OPERATION

(75) Inventors: John Stanko, Rolling Hills Estates; Lowell Pearson, Hermosa Beach, both of CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/546,121

(22) Filed: Apr. 10, 2000

Related U.S. Application Data

(63) Continuation-in-part of application No. 08/877,272, filed on Jun. 17, 1997, now Pat. No. 6,047,926.
(60) Provisional application No. 60/022,508, filed on Jun. 28, 1996.

(51) Int. Cl.$^7$ .............................. B64D 15/00; B05B 1/28
(52) U.S. Cl. .............................. 244/134 R; 244/134 C; 239/296; 239/290
(58) Field of Search ........................ 244/134 R, 134 C; 239/296, 290

(56) References Cited

U.S. PATENT DOCUMENTS

| | | |
|---|---|---|
| 1,868,468 A | 7/1932 | Thompson |
| 1,943,062 A | 1/1934 | Driscoll |
| 2,249,940 A | 7/1941 | Bulloch |
| 2,312,187 A | 2/1943 | Patterson |
| 2,390,093 A | 12/1945 | Garrison |
| 2,406,473 A | 8/1946 | Palmatier |
| 2,422,746 A | 6/1947 | Patterson |
| 2,457,031 A | 12/1948 | Campbell et al. |
| 2,832,528 A | 4/1958 | Spears, Jr. |
| 2,938,509 A | 5/1960 | Carbonero |
| 3,086,713 A | 4/1963 | Moldenhauer |
| 3,101,175 A | 8/1963 | Brown, Jr. |
| 3,160,347 A | 12/1964 | Ackley et al. |
| 3,243,123 A | 3/1966 | Inghram et al. |
| 3,485,176 A | 12/1969 | Telford et al. |
| 3,533,395 A | 10/1970 | Yaste |
| 3,602,211 A | 8/1971 | Charman |
| 3,612,075 A | 10/1971 | Cook |
| 3,684,185 A | 8/1972 | Helmrich |
| 3,684,186 A | 8/1972 | Helmrich ..................... 239/400 |
| 3,770,062 A | 11/1973 | Riggs ......................... 169/24 |
| 3,777,983 A | 12/1973 | Hibbins |
| 3,835,498 A | 9/1974 | Arato |
| 3,985,223 A | 10/1976 | Forcella et al. ............. 198/479 |
| 4,007,793 A | 2/1977 | Hux et al. .................... 169/25 |
| 4,032,090 A | 6/1977 | Thorton-Trump |
| 4,073,437 A | 2/1978 | Thorton-Trump |
| 4,118,151 A | 10/1978 | Murakami et al. |
| 4,191,348 A | 3/1980 | Holwerda |
| 4,221,339 A | 9/1980 | Yoshikawa |
| 4,225,086 A | 9/1980 | Sandell |

(List continued on next page.)

FOREIGN PATENT DOCUMENTS

| | | |
|---|---|---|
| DE | 767 362 | 6/1952 |
| DE | 1 266 137 | 4/1968 |
| DE | 2 343 389 | 3/1974 |
| DE | 195 22 881 | 11/1996 |
| EP | 0 298 779 | 1/1989 |
| FR | 1149351 | 12/1957 |
| GB | 822 811 | 11/1959 |

*Primary Examiner*—Charles T. Jordan
*Assistant Examiner*—Christian M. Best
(74) *Attorney, Agent, or Firm*—William J. Zak, Jr., Esq.

(57) ABSTRACT

A hybrid deicing system for deicing ice or snow covered surfaces comprises a source of pressurized air and a source of pressurized deicing fluid. A nozzle assembly receives the pressurized air and the pressurized deicing fluid at a forward position, a middle position or a rearward position of the nozzle assembly. The nozzle assembly discharges the pressurized deicing fluid and pressurized air as a first independent stream within a second independent stream.

53 Claims, 4 Drawing Sheets

U.S. PATENT DOCUMENTS

| | | | |
|---|---|---|---|
| 4,309,049 A | 1/1982 | Chevallier | 285/18 |
| 4,333,607 A | 6/1982 | Mueller et al. | |
| 4,378,755 A | 4/1983 | Magnusson et al. | |
| 4,565,321 A | 1/1986 | Vestergaard | 239/172 |
| 4,634,084 A | 1/1987 | Magnusson | |
| 4,652,025 A | 3/1987 | Conroy, Sr. | |
| 4,723,733 A | 2/1988 | McClinchy | |
| 4,741,499 A | 5/1988 | Rudolph et al. | |
| 4,826,107 A | 5/1989 | Thorton-Trump | |
| 4,842,005 A | 6/1989 | Hope et al. | |
| 4,872,501 A | 10/1989 | Hightower | 165/1 |
| 4,915,300 A | 4/1990 | Ryan | |
| 4,932,121 A | 6/1990 | Jestaat et al. | |
| 4,986,497 A | 1/1991 | Susko | |
| 5,028,017 A | 7/1991 | Simmons et al. | |
| 5,096,145 A | 3/1992 | Phillips et al. | |
| 5,104,068 A | 4/1992 | Krilla et al. | |
| 5,134,266 A | 7/1992 | Peppard | 219/10.55 A |
| 5,134,380 A | 7/1992 | Jonas | |
| 5,165,606 A | 11/1992 | Pelet | |
| 5,180,122 A | 1/1993 | Christian et al. | 244/134 F |
| 5,244,168 A | 9/1993 | Williams | |
| 5,282,590 A | 2/1994 | Zwick | |
| 5,318,254 A | 6/1994 | Shaw et al. | 244/134 C |
| 5,337,961 A | 8/1994 | Branbani et al. | |
| 5,454,532 A | 10/1995 | Whitmire | |
| 5,490,646 A | 2/1996 | Shaw et al. | 244/134 C |
| 5,520,311 A | 5/1996 | Wolfe | |
| 5,520,331 A | 5/1996 | Wolfe | |
| 5,549,246 A * | 8/1996 | Kukesh | 239/296 |
| 5,632,072 A | 5/1997 | Simon et al. | |
| 5,730,806 A | 3/1998 | Caimi et al. | |
| 5,746,396 A | 5/1998 | Thorton-Trump | |
| 5,755,404 A | 5/1998 | Numbers | 244/134 C |
| 5,779,158 A | 7/1998 | Baker | |
| 5,785,721 A | 7/1998 | Brooker | |
| 6,029,934 A | 2/2000 | Foster | 244/134 C |
| 6,045,092 A | 4/2000 | Foster | 244/134 C |
| 6,047,926 A | 4/2000 | Stanko et al. | 244/134 R |

* cited by examiner

HYBRID DEICING SYSTEM AND METHOD OF OPERATION

CROSS REFERENCE TO RELATED APPLICATION

This is a continuation-in-part of application Ser. No. 08/877,272 filed Jun. 17, 1997, U.S. Pat. No. 6,047,926, which claims the benefit of U.S. Provisional Application No. 60/022,508 filed Jun. 28, 1996.

BACKGROUND OF THE INVENTION

This invention relates to a system for deicing aircraft and more particularly to a glycol/air coaxial stream deicing system wherein glycol and forced air are applied as a glycol stream within a forced air stream. The stream is charged to hydrodynamically dislodge and remove ice or other frozen deposits from surfaces such as aircraft.

As used herein, the terms "glycol," "deicing fluid," and "Type 1 fluid" are used interchangeably to mean Type 1 deicing fluid—a mixture of glycol (ethylene or propylene) and water. This is distinct from Type II, III or IV "anti-icing" fluids used to prevent the accumulation of frozen precipitation on aircraft surfaces that have been previously de-iced.

Ground deicing of aircraft is an important step in preparing aircraft for safe flight during snow, ice and frost weather conditions. Accumulation of these winter products on aircraft surfaces (e.g., wings, tail and rudder) disturbs the aerodynamic performance of these surfaces creating unstable flight conditions and this has caused aircraft to crash.

Conventional aircraft deicing systems consist of ground or truck mounted spray systems that apply hot (typically about 180° F.) deicing fluid at rates varying from 35 gallons per minute (gpm) to 100 gpm to the aircraft surfaces. The most common spray nozzle is the same type used by firefighters. This nozzle (e.g., Task Force Tip) can spray a solid jet from 1 to 2 inches in diameter or be adjusted to a very wide conical spray pattern. Conventional deicing thermally removes snow and ice by melting it away and augmented, to some extent, by the hydrodynamic sweeping action of the deicing jet. This deicing process is effective but often very large amounts of deicing fluid are used, particularly if there is much accumulation of wet snow or the snow and ice are frozen to the aircraft surfaces. Since glycol is expensive and toxic, conventional deicing creates significant economic and waste management problems for airline and airport operators.

Various deicing systems using little or no glycol have been tried and, to date, these systems have demonstrated limited effectiveness. Therefore, they have not gained acceptance by commercial deicing operators. A common approach for deicing aircraft while reducing glycol usage is to use a combination of forced air and conventional deicing systems. Such systems have been used by the U.S. Air Force for decades. The Air Force is using what they call "hot blast" deicing trucks at various bases such as Elmendorf AFB in Alaska. The "hot blast" deicer has an auxiliary power unit (APU) which produces about 35 pounds per square inch (psi) of air at a flow rate of 100 pounds per minute (ppm). This air is delivered to a dedicated air nozzle to first flow away the loose snow and ice. The conventional system is then turned on to finish the job in this 2-step process.

The "hot blast" deicer saves glycol but it significantly extends the deicing cycle time because it is a 2-step process. This is very undesirable for commercial deicers where tight schedules must be maintained. Furthermore, under severe deicing conditions, when air alone is not very effective, the glycol savings are minimal because the conventional process becomes the primary method of deicing.

Some of the patents covering conventional deicing and its refinements include U.S. Pat. Nos. 3,243,123; 4,073, 4,826, 107; and 5,028,017. Other publications describe various deicing systems, (some of which are believed to have been tested) to improve the deicing process, either by reducing or eliminating the use of glycol, or by applying glycol in a more efficient manner such that the glycol usage is reduced. These include, for instance, U.S. Pat. Nos. 5,244,168 and 5,104, 068.

Deicing fluid entrained in air has been know for a number of years, as shown for instance in U.S. Pat. Nos. 2,482,720 and 2,406,473. In U.S. Pat. No. 5,244,168, a "well-dispersed atomized spray pattern" (col. 7, line 35) or a "spray pattern of a high speed colloidal suspension of deicing fluid in air" (claim 1, lines 21–22) is produced. In this latter patent, the glycol mixes and atomizes in the air stream. The energy transfer process associated with the mixing and atomizing reduces the kinetic energy of the air stream which, in turn, reduces the effectiveness of the air stream/glycol mixture to dislodge snow and ice that is frozen to or adhered to an aircraft. Thus, this atomization process reduces the effectiveness of the air stream in breaking loose snow and ice that is frozen to or adhered to an aircraft surface and also reduces the effectiveness of the air stream in moving heavy, wet snow. In addition, the mixture of atomized glycol and high velocity air adds more wetness to the snow further inhibiting the removal of wet snow.

Another novel deicing technique developed by InfraTek Radiant Energy Corporation uses gas-fired infra-red heaters built into the interior structure of a large prefab type hangar to melt ice from the aircraft surfaces. Two fundamental problems have surfaced with this deicing process. First, the frequency of the infra red heaters is such that snow melts slowly, extending the deicing cycle time. Second, testing shows that melting ice from the upper surfaces of the aircraft often re-freezes on the lower surfaces not exposed to the infra-red rays.

U.S. Pat. No. 5,104,068 describes an apparatus for both de-icing and anti-icing an aircraft in one "pass." The apparatus consists of articulated booms on each side of the aircraft to be processed. These booms extend over the entire length of each wing and each has two series of nozzles. One set is for dispensing a deicing fluid mixture and the other set is for dispensing anti-icing fluid. There is also a set of booms underneath the aircraft for processing the lower aircraft surfaces. The patent also describes the use of different mixtures of pressurized air, water and glycol (Type I) with the mixture varied in accordance with the particular weather conditions. The apparatus and process described above are commercially known by the name "Whisper Wash." Benefits expected to be realized presumably include reduced glycol usage and reduced de-ice/anti-ice cycle time.

SUMMARY OF THE INVENTION

The present invention overcomes disadvantages of the prior systems and provides a new hybrid deicing system that produces an independent, high velocity stream of deicing fluid that is encased by an independent stream of air at a substantially equal velocity for efficient and effective removal of ice from a surface. This invention ("hybrid deicing"), utilizing two fluid flow technologies and a unique coaxial nozzle, yields an efficient, stand-alone deicing system, i.e. a complete deicing system that reduces glycol usage and deicing cycle time. Laboratory tests have validated that "hybrid deicing" can quickly and safely remove snow and ice frozen to a simulated aircraft surface. These tests also indicate that deicing glycol usage can be reduced to 10% or less relative to conventional usage, thereby providing the deicing operator with significant economic and waste management benefits. It is estimated that hybrid deicing will reduce conventional deicing cycle time, in many deicing situations, by 10% or more providing an additional benefit to the operator.

In the present invention, an essentially independent stream within an essentially independent stream provides a deicing fluid (such as a glycol/water mixture) entrained within and encased by a surrounding jacket of entraining fluid (such as air). Also provided is a coaxial nozzle assembly that produces two essentially independent streams of Type I glycol fluid and air. Both streams exit the nozzle assembly at substantially equal velocities and, preferably, at or above sonic velocity such as about 600–800 mph. The precise velocity of the streams depends on the upstream pressures and temperatures of the fluids.

This combination of a high velocity coaxial stream within a stream hydrodynamically and thermally removes adhered ice, freezing rain, and snow (light, wet or heavy). Further, the surrounding sheath or stream of forced air reduces the fluid energy and momentum loss of the inner stream of deicing fluid, thereby increasing the effective snow/ice removal range (i.e., distance from the nozzle exit) of the combined streams. This invention will de-ice aircraft and other surfaces as effectively as the conventional hot glycol wash method but with glycol application rates reduced to 10% or less of conventional rates. Consequently, the present invention significantly reduces deicing costs and the impact on the environment.

BRIEF DESCRIPTION OF THE DRAWINGS

The present invention will become more readily apparent from the following description of preferred embodiments thereof, illustrated, by way of examples, in the accompanying drawings, in which.

DETAILED DESCRIPTION OF THE INVENTION

Figure 1:
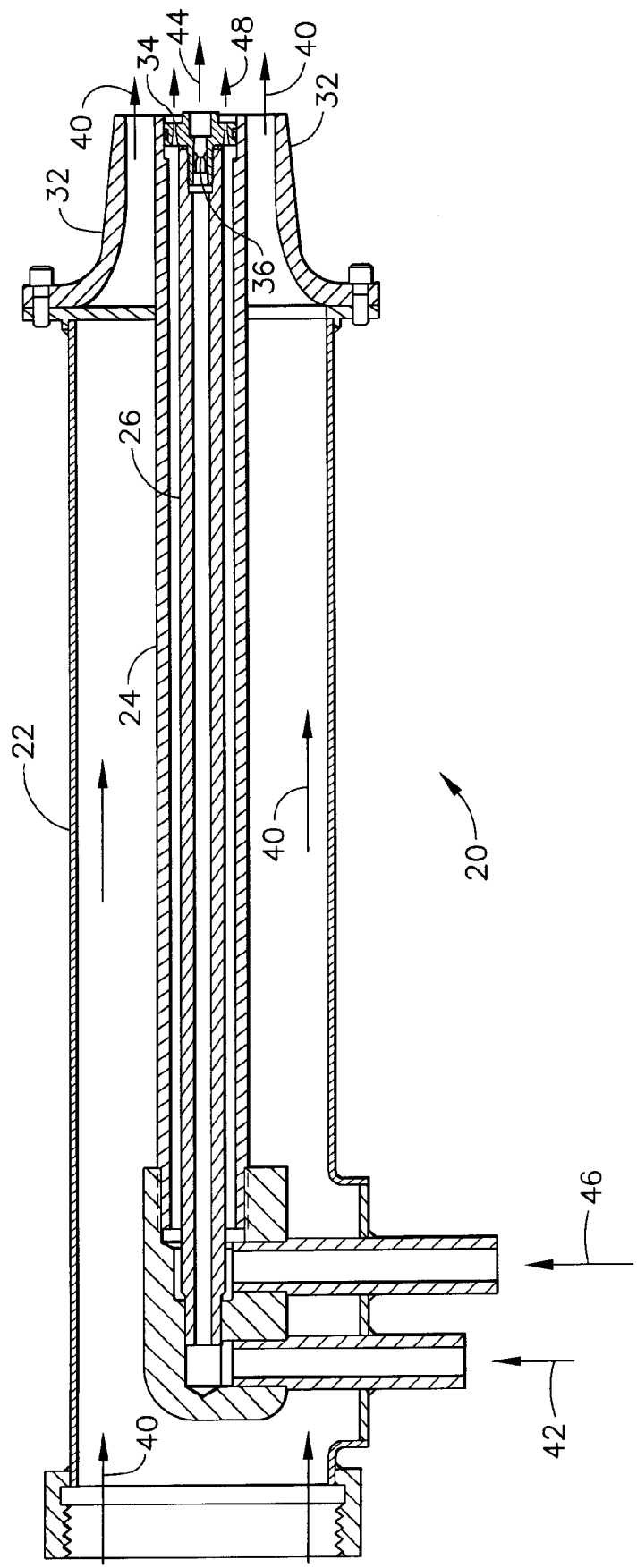
FIG. 1 is a side, cross-sectional view of a coaxial nozzle assembly in accordance with the present invention.
Figure 4:
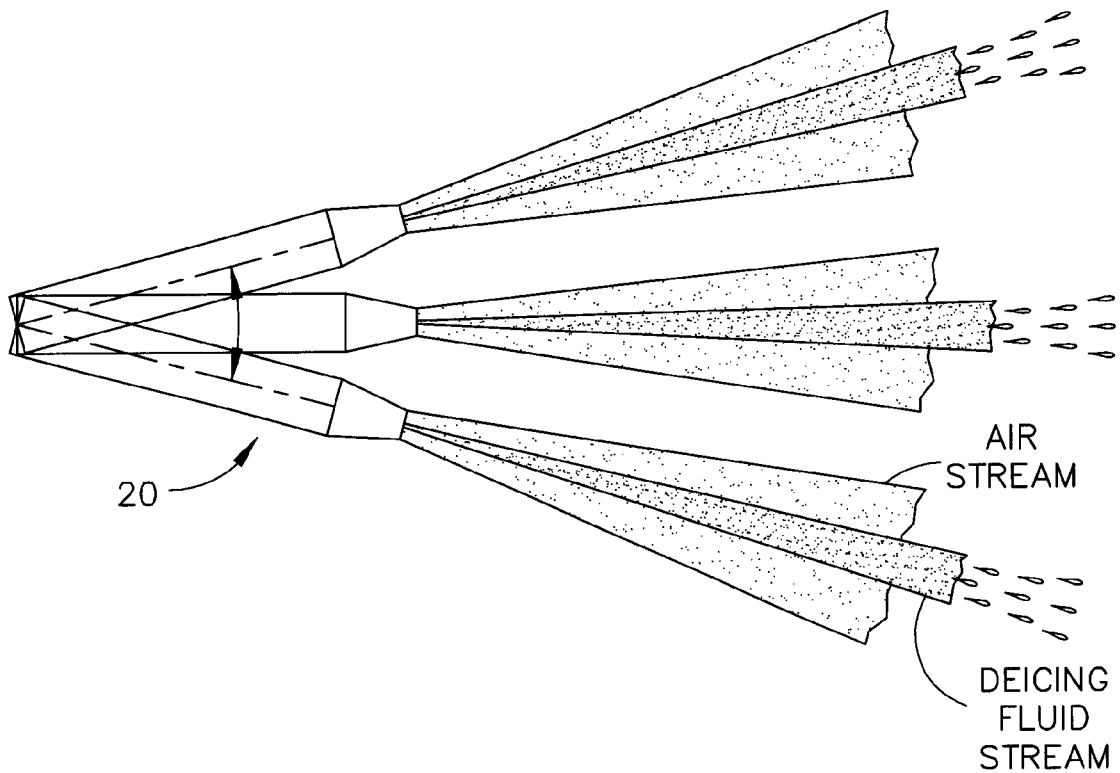
FIG. 4 is an illustration of the frozen snow removal process by an independent stream within an independent stream produced by the nozzle assembly shown in FIG. 1.
Figure 7:
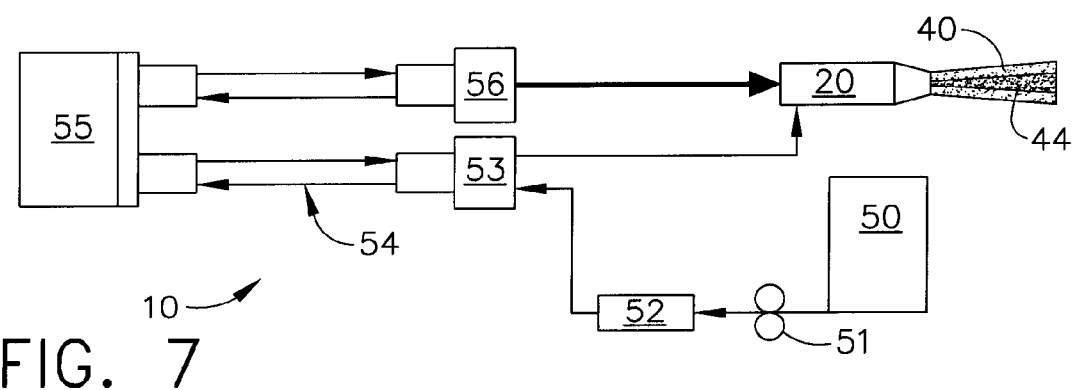
FIG. 7 is a schematic illustration of a deicing system that incorporates a nozzle assembly such as the one shown in FIG. 1.

Referring now to FIGS. 1 and 7, the stand-alone, ground based hybrid deicing system 10 of the present invention utilizes a coaxial nozzle assembly 20 that simultaneously delivers two independent, high velocity deicing streams. Preferably, a deicing fluid stream is encased within a high velocity air stream (FIG. 4).

The coaxial nozzle assembly 20 melds two fluid flow technologies—conversion of subsonic airflow to sonic or near sonic airflow and high pressure liquid jetting—to create two independent streams that are effective for deicing surfaces such as aircraft. The coaxial nozzle assembly 20, in one embodiment, has two concentric pipes along the centerline of the assembly 20 with low and high flow deicing fluid nozzles and a converging air nozzle. More specifically, the coaxial nozzle assembly 20 comprises three concentric cylinders 22, 24, 26 and three nozzles 32, 34 36. However, the present invention contemplates that more or less cylinders and nozzles can be utilized. For example, more cylinders and nozzles can be used to provide a larger number of deicing fluids at different velocities, or fewer cylinders and nozzles can be used for fewer deicing fluids at different velocities.

Figure 3:
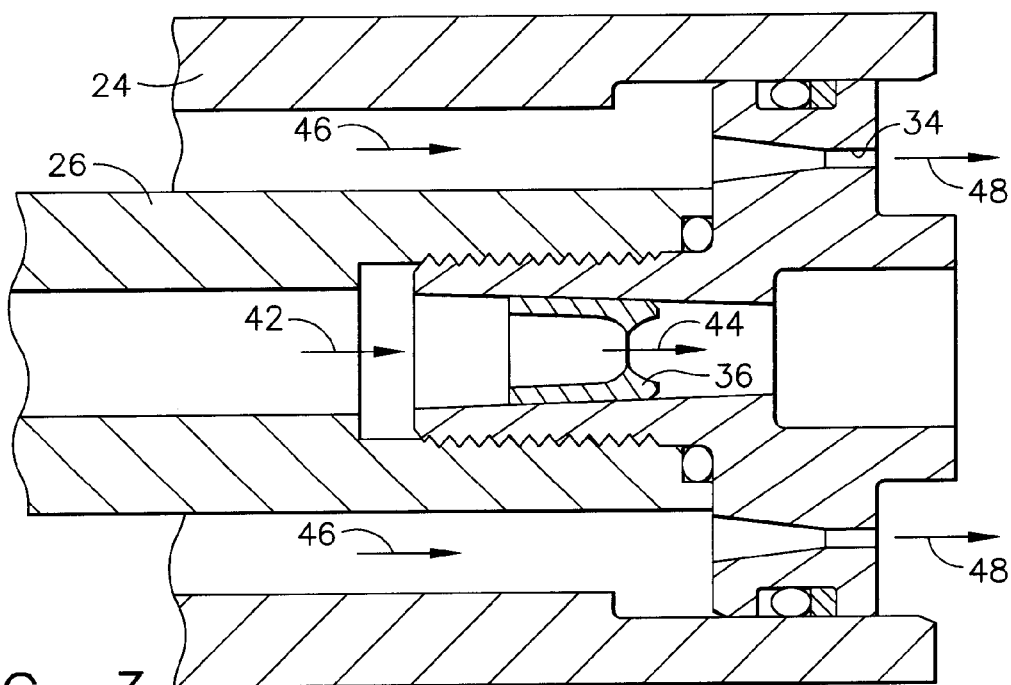
FIG. 3 is an enlarged, side, cross sectional view of the exit of the nozzle assembly shown in FIG. 1.

In this particular embodiment, the cylindrical arrangement provides two flow passages for the deicing fluid and one flow passage for the forced air. The outer cylinder 22 has a converging nozzle 32 at one end 38 where pressurized air 40 exits. Along the centerline of the cylindrical air nozzle assembly 20 are two concentric pipes 24 and 26. For this particular embodiment, the inner pipe 26 delivers high pressure (e.g., up to 7000 psi) deicing fluid 42 at approximately 6–9 gpm to a fluid jetting nozzle or carbide insert 36 at the center of the nozzle assembly 20. In turn, a high velocity deicing fluid stream or jet 44 at about 750 mph is produced (FIG. 3). A higher flow of about 9 gpm can increase the deicing fluid momentum and, thus improve the deicing process.

The inside of the outer pipe 24 and the outside of the inner pipe 26 form an annular passage for low pressure deicing fluid in the pressure range of 150–4500 psi. At a higher pressure of around 4500 psi, the exit velocity of the deicing fluid tends to be more equal to the exit velocity of the air, as further described below. In turn, the fluid momentum is increased, thereby reducing any mixing of the deicing fluid and air as they exit the nozzle assembly 20. The low pressure deicing fluid preferably exits the coaxial nozzle assembly 20 through the nozzle or annular array of orifices 34 (FIG. 2) at approximately 20 gpm and 600 mph in streams or jets 48 (FIG. 3) which combine to form a single stream. The exits of the inner pipes 24 and 26 are substantially flush with exit of the air nozzle 32 (FIG. 3).

While the above embodiment depicts the air 40 and the deicing fluid 42 or 46 being introduced into the nozzle 20 at rearward position, the present invention contemplates that other points of introduction can be utilized. For example, either the air 40, or the deicing fluid 42 or 46, or both can be introduced into the nozzle assembly 20 at a middle position or even a forward position, i.e., close to the nozzle assembly 20 exit. Furthermore, while the above embodiment depicts the deicing fluid 42 or 46 entering at about 90 degrees to the longitudinal axis of the nozzle assembly 20, and then being directed co-axial, it is contemplated that other angles of entry can be used. Additionally, the present invention contemplates that the modes of introducing the deicing fluid and air can be reversed, even though the air 40 still exits the nozzle assembly 20 in a stream that surrounds or encases the stream of deicing fluid 42 or 46. In such instance, for example, the deicing fluid 42 or 46 would enter the nozzle assembly 20 parallel to its longitudinal axis while the air 40 would enter non-parallel to the longitudinal axis, such as perpendicular.

Regardless of the mode of introduction, the air 40 and the deicing fluid 42 or 46 exit the nozzle assembly 20 in the same direction (i.e., co-axial) and at substantially the same velocity. This produces outside of the nozzle assembly 20 an independent stream of deicing fluid 44 or 48 within an independent stream of air 40 such that "minimal" or "incidental" or "unintentional" mixing at the interfaces of the streams occurs. The reference to "minimal" mixing is intended to distinguish from a "Well-dispersed atomized spray pattern" or a "colloidal suspension" in the prior art wherein mixing is intentional as opposed to unintentional. While subject to variance, it is preferred that the amount of minimal mixing is about 1 to 3 vol. % of one stream in the other at about 12" from the exit of the nozzle assembly 20.

A key feature of the present invention is the compatibility of the exit fluid streams. Pressurized air 40 from a centrifugal compressor 56 (FIG. 7) enters the coaxial nozzle assembly 20 at approximately 100 ppm and 13 psig, as an example. The convergent nozzle 32 (ASME "long radius" nozzle) accelerates the air 40 to sonic or near sonic velocity with minimal energy loss. The air 40 exits the coaxial nozzle assembly 20 as an independent air stream 40 through the annular region formed by the inside of the nozzle 32 and the outside of the outer deicing fluid pipe 24.

In a low flow, high pressure mode of operation (for example, 9 gpm and 7000 psi), deicing fluid 42 flows through the inner pipe 26 and exits through the carbide fluid jetting nozzle 36 (FIGS. 1 and 2) in a solid conical pattern (FIG. 4). The converging nozzle 32, together with the inlet pressures of the air 40 and deicing fluid 42, achieves equal exit velocities of approximately 600–800 mph for both fluids in this instance. The same can occur for the deicing fluid 46 whereby it flows through the outer pipe 24 and exits through the jetting nozzle 34 in a solid conical pattern. FIG. 4 is an illustration of the independent stream within a stream of the present invention, together with the sweeping action found to be effective in using the present invention.

Figure 5:
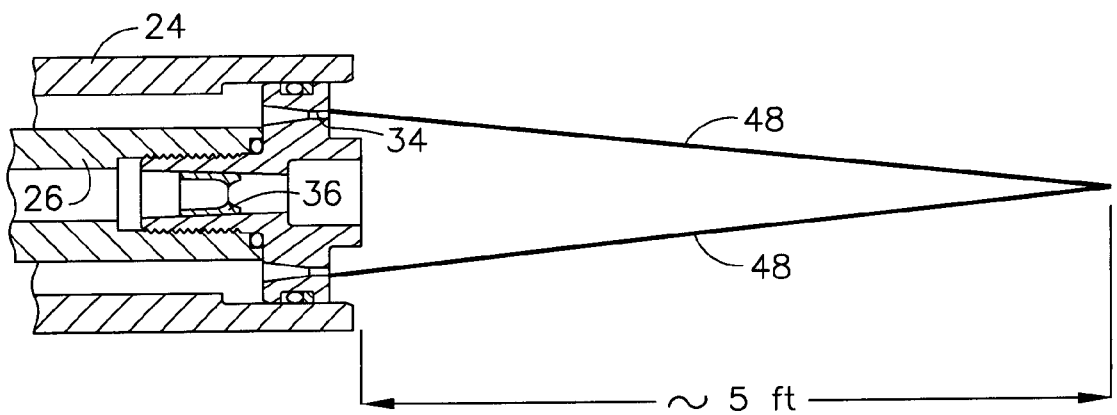
FIG. 5 is an illustration of a converging spray pattern produced a nozzle assembly according to one embodiment of the present invention.

The conical streams 40, 44, 48 can be altered, however, to converge at varying distances from the nozzle assembly 20 in order to vary the distance of the concentrated hydrodynamic energy. In other words, the hydrodynamic energy should correspond to the working distance of the aircraft surface from the assembly 20. The alteration of the conical streams 40, 44 or 48 can be achieved by altering the orientation of the jetting nozzles 32, 34, 36. In FIG. 5, as an example, the streams 48 are at 20 gpm but altered to converge at a five (5) foot working distance, which is one that seems to be preferred by deicing operators.

Figure 6A:
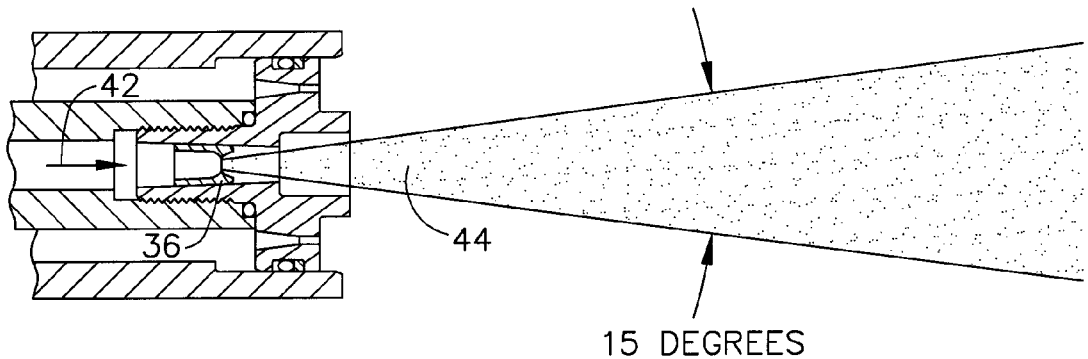
FIG. 6A is a side view of an illustration of a flat fan spray pattern produced by a nozzle assembly according to a second embodiment of the present invention.
Figure 6B:
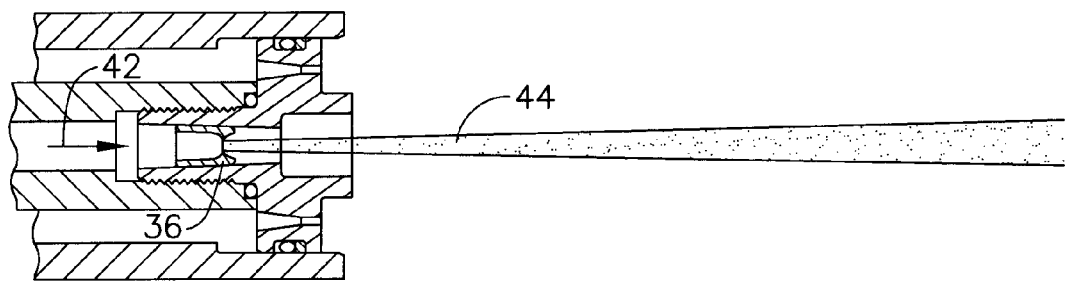
FIG. 6B is a top view of an illustration of the flat fan spray pattern shown in FIG. 6A.

Furthermore, the streams 40, 44, 48 can have configurations other than conical. For example, the streams may have a flat fan pattern, as shown in FIGS. 6A and 6B. In the side view of FIG. 6A, the stream 44 is at 9 gpm and in a 15-degree flat fan pattern. FIG. 6B is a top view of the fan pattern in FIG. 6A and shows little divergence of the stream pattern and, thus, its flatness characteristic. As an example, the flat fan spray pattern can be accomplished by providing a slot with concave sides in the carbide insert 36 of the nozzle assembly 20.

Under most deicing conditions, the maximum flow rate of the deicing fluids 42, 46 is only about 9 gpm in comparison to conventional deicing flow rates of 60 gpm or more. Since, in the hybrid deicing process of the present invention, the deicing fluid stream can be, turned "on" or "off" abruptly by the deicing operator, glycol consumption is further reduced. For example, the deicing operator turns "off" the deicing fluid 42 or 46 when removing dry or near dry powder snow that is not adhered to a surface. After deicing under these conditions, the operator can turn "on" the deicing fluid 42 or 46 to apply a final over spray of fluid for providing anti-icing holdover time prior to takeoff of an aircraft.

Figure 2:
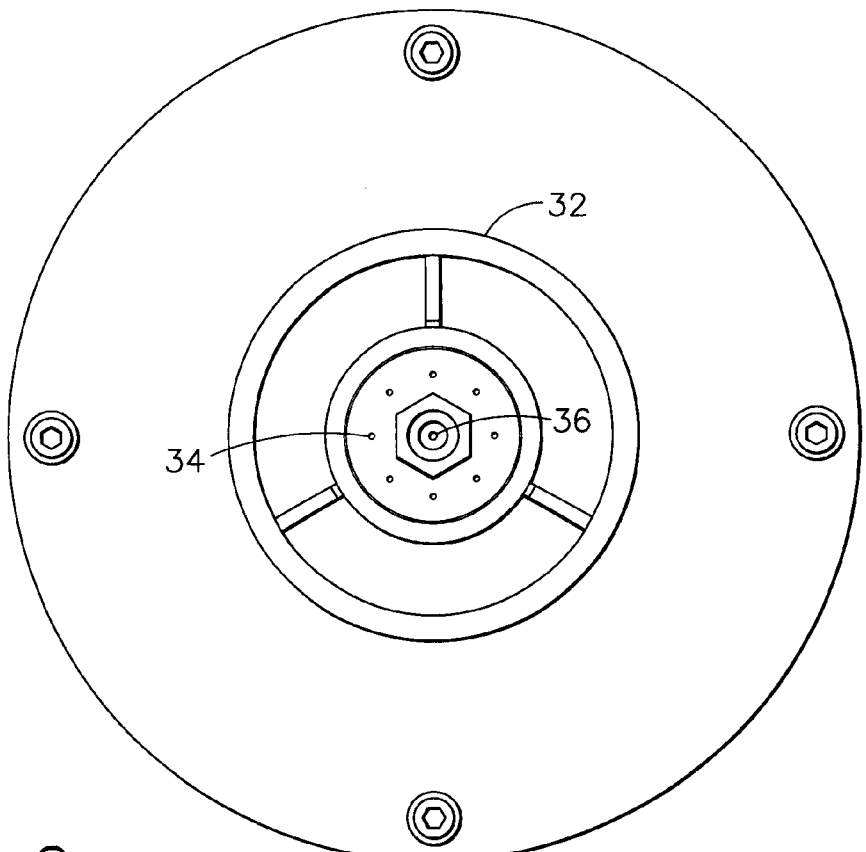
FIG. 2 is an enlarged end view of the coaxial nozzle assembly shown in FIG. 1.

The purpose of a high flow, low pressure mode according to the present invention is to address, for example, the fairly infrequent but severe icing conditions that result in the formation of ¼ inch or more of hard ice frozen to aircraft surfaces. Under these conditions, a deicing process similar to a conventional hot deicing fluid wash down must be employed, i.e., thermal removal of the ice. With the present invention, an independent high velocity air stream encasing an equally high velocity, inner fluid stream assists in the snow removal process and also blows away the steam that forms. Therefore, the air stream has an added benefit of helping the operator to better see what he is doing. For hard, thick ice an operator can switch remote valves (as further described below) to direct the deicing fluid 46 to the outer annual flow passage and the annular orifice array 34 (FIG. 2). A high pressure pump described below is sped up so that the deicing fluid delivery is increased from 9 gpm to 20 gpm, for example. Since the 20 gpm deicing fluid 46 now flows through a much larger orifice area, the pressure in the annular flow passage drops from 7000 psi to 4500 psi, for example; hence, the low pressure, high flow mode of operation.

Therefore, the hybrid deicing process of the present invention is adjustable on the spot to the specific deicing conditions encountered and all deicing conditions can be efficiently addressed. This adjustment capability maximizes effectiveness of the process and is consistent with the goal of this invention to minimize glycol consumption and waste management. FIG. 3 shows the side view of the coaxial nozzle assembly 20 exit and the deicing fluid exit points for the two modes of operation using deicing fluid. In either case, the nozzle assembly 20 produces outside of it an independent inner deicing fluid stream 44 or 48 that is surrounded by an independent outer air stream 40, both of which are traveling at about the same velocity. A third mode of operation uses air only.

FIG. 7 is schematic block diagram of a glycol forced air deicing system 10 including a deicing fluid tank 50 coupled to a boost pump 51. Downstream of the boost pump 51 is a heater 52 (that can heat the deicing fluid up to about 185° F., as an example) and then a triplex high pressure pump 53. Preferably, the pump 53 is able to provide a pulsating flow of deicing fluid in order to increase the effectiveness of the deicing process, somewhat similar to a sonic cleaning process. In such instance, the pump 53 can have one piston slightly smaller in diameter that the other two and, therefore smaller in displacement. Thus, the output pressure fluctuates once per revolution.

Irrespective of whether there is pulsation, from the high pressure pump 53 a pressurized deicing fluid (such as about 9 gpm at 7000 psi or 20 gpm at 4500 psi) is pumped into the nozzle assembly 20. The high pressure pump 53 is driven by a hydraulic drive system 54, while a diesel engine 55 drives the hydraulic system 54. The diesel engine 55 also drives the centrifugal compressor 56 that provides to the nozzle assembly 20 a pressurized air (such as about 100 ppm at 13 psig). The system 10 allows an operator to continuously adjust between all three deicing fluid modes. Alternatively, an operator can select one of three deicing fluid flow modes: i) low flow (e.g., 9 gpm) for most deicing conditions; ii) high flow (e.g., 20 gpm) for hard ice removal; or iii) flow off for air only removal.

A feature of hybrid deicing in accordance with the present invention results from its reduced deicing fluid usage - greater on station availability of a deicer truck. In other words, a deicer truck typically has a 2000 gallon Type I deicing fluid tank that is refilled at the airline's maintenance facility which is usually far removed from where deicing is done, i.e., at the gate or near the takeoff area. But due to its low usage of deicing fluid, a deicer truck utilizing the present invention can de-ice about 10 times the number of aircraft that a conventional deicing truck can de-ice.

Conventional aircraft ground deicing systems consist of ground or truck mounted spray systems which apply hot (e.g., 180° F.) deicing fluid (e.g., a mixture of glycol and water) at rates up to 60 gpm to the aircraft surfaces. This thermal process is effective in quickly melting the snow or ice from these surfaces, i.e. wings, etc. However, glycol is expensive and toxic creating significant economic and waste management problems for airline and airport operators. On the other hand, the present invention provides an independent, high energy, low flow deicing fluid stream within a high velocity air stream that does much of the work to break loose ice and frozen snow from aircraft surfaces or to move heavy, wet snow. A significant savings to airline operators in reduced glycol usage, greater on station availability of deicer trucks, and reduced waste management problems are the benefits of this new hybrid deicing process.

Hybrid deicing in accordance with the present invention also increases the aerodynamic sweeping action of a high velocity air stream 40 by adding to it an inner stream of a high deicing fluid 44 or 48. Since the maximum flow rate of the glycol is only 9 gpm in this instance and the glycol stream can be abruptly turned on or off by the deicing operator, glycol consumption is greatly reduced in comparison to glycol consumption for conventional deicing. The deicing operator turns on the glycol stream only when required by the deicing conditions, i.e. localized patches adhered ice/snow. Also, the operator can apply a final over spray of glycol after deicing, a conventional practice, for providing anti-icing prior to takeoff.

While the sketches, illustrations and detailed descriptions disclose the particulars, general and specific attributes of the embodiment of the method, apparatus and systems of the invention, they should not be construed nor assumed by anyone and/or those skilled in the art that they limit the scope of the present invention. The details are a mere attempt, for the purpose of clarifications and to express ideas, to explain the principles, to aid and guide an individual/s with expertise in the field to visualize the concepts of said invention. As a plurality of modifications and variations of the present invention are probable and possible, taking into consideration the disclosure of the sketches, illustrations and detailed descriptions, it should be understood that the citing, teaching and referring to some and all equivalent elements or combinations for achieving substantially the same results may be practiced otherwise than as uniquely and precisely explicated and described.

What is claimed is:

1. A system comprising:
   a source of pressurized air;
   a source of pressurized fluid containing ethylene glycol or propylene glycol;
   a nozzle assembly that receives the pressurized air from said source of pressurized air and receives the pressurized fluid from said source of pressurized fluid, said nozzle assembly being configured to discharge the pressurized fluid and the pressurized air as first and second independent streams, respectively,
   wherein the first and second streams exit said nozzle assembly at substantially the same velocity.

2. A system according to claim 1, wherein said nozzle assembly receives the pressurized fluid at a forward position.

3. A system according to claim 1, wherein the first stream exits said nozzle assembly at about 9 gpm and 7000 psi.

4. A system according to claim 1, wherein the first stream exits said nozzle assembly at about 20 gpm and 4500 psi.

5. A system according to claim 1, wherein the first stream exits said nozzle assembly at about sonic velocity.

6. A system according to claim 1, wherein the second stream exits said nozzle assembly at about sonic velocity and 100 ppm.

7. A system according to claim 1, further comprising:
   a pump in air communication with said nozzle assembly;
   a compressor in fluid communication with said nozzle assembly;
   a hydraulic drive system that drives said pump and said compressor; and
   a diesel engine that drives said hydraulic drive system.

8. A nozzle assembly for a deicing system, comprising:
   a nozzle;
   a first pipe within said nozzle, said first pipe for flowing a deicing fluid within said nozzle;
   a second pipe within said nozzle, said second pipe for flowing air within said nozzle such that said air surrounds said deicing fluid,
   whereby said deicing fluid and air exit said nozzle as a deicing fluid stream encased by an air stream.

9. The nozzle assembly of claim 8, wherein said first pipe enables said deicing fluid to enter said nozzle at one of a rearward position, a middle position, and a forward position of said nozzle.

10. The nozzle assembly of claim 8, wherein said second pipe enables said air to enter said nozzle at one of a rearward position, a middle position, and a forward position of said nozzle.

11. The nozzle assembly of claim 8, wherein said deicing fluid stream and air stream are independent of one another.

12. The nozzle assembly of claim 8, wherein said deicing fluid and air streams form a flat fan spray pattern.

13. The nozzle assembly of claim 12, wherein said pattern extends over 15-degrees.

14. The nozzle assembly of claim 8, wherein said deicing fluid stream exits said nozzle at about 9 gpm and 7000 psi.

15. The nozzle assembly of claim 8, wherein said deicing fluid stream exits said nozzle at about 20 gpm and 4500 psi.

16. The nozzle assembly of claim 8, wherein said air stream exits said nozzle at about a sonic velocity and 100 ppm.

17. The nozzle assembly of claim 8, wherein said air stream minimizes dispersion of said deicing fluid stream to maintain the concentrated momentum of said deicing fluid stream.

18. The nozzle assembly of claim 8, wherein said deicing fluid stream pulsates.

19. The nozzle assembly of claim 8, wherein said deicing fluid stream converges at about 5 feet from an exit of said nozzle.

20. The nozzle assembly of claim 8, wherein said nozzle includes three concentric passages.

21. The nozzle assembly of claim 17, wherein said deicing fluid flows in two of said three passages and said air flows in a third passage.

22. A method comprising:
   introducing pressurized fluid containing ethylene glycol or propylene glycol into a nozzle assembly;

introducing pressurized air into the nozzle assembly;

coupling the fluid and air at exit from the nozzle assembly to produce a fluid stream and an air stream, the fluid stream and the air stream being independent of one another, wherein said coupling is effected so that the fluid stream and the air stream have substantially the same exit velocity from the nozzle assembly.

23. A method according to claim 22, wherein the fluid stream is formed within the air stream.

24. A method according to claim 22, wherein the fluid stream is encased within the air stream.

25. A method according to claim 22, further comprising pulsating the fluid stream.

26. A method according to claim 22, further comprising forming the fluid and air streams into a flat fan pattern.

27. A method according to claim 22, further comprising accelerating the pressurized air to about sonic velocity.

28. A method according to claim 22, wherein the fluid stream exits the nozzle assembly at one of about (a) 9 gpm and 7000 psi and (b) 20 gpm and 4500 psi.

29. A hybrid deicing system for deicing ice or snow covered surfaces comprising:

a source of pressurized air;

a source of pressurized deicing fluid;

a nozzle assembly that is configured to discharge the pressurized deicing fluid and pressurized air as a first independent stream within a second independent stream, wherein the first stream exits said nozzle assembly at about sonic velocity.

30. A method for deicing an ice or snow covered surface, comprising:

introducing pressurized deicing fluid into a nozzle assembly;

introducing pressurized air into the nozzle assembly;

coupling the deicing fluid and air at exit from the nozzle to produce a deicing fluid stream and an air stream, the deicing fluid stream being independent of the air stream, wherein the pressurized air is accelerated to about sonic velocity.

31. A system according to claim 1, wherein the first and second streams exit said nozzle assembly in substantially the same direction.

32. A system according to claim 1, wherein the first stream is within the second stream.

33. A system according to claim 32, wherein the first and second streams exit said nozzle assembly in substantially the same direction.

34. A system according to claim 1, wherein said nozzle assembly receives the pressurized air from said source of pressurized air at a forward position, or said nozzle assembly receives the pressurized air at a middle position, or said nozzle assembly receives the pressurized air at a rearward position, and wherein said nozzle assembly receives the fluid from said source of pressurized fluid at the forward position, or said nozzle assembly receives the fluid from said source of pressurized fluid at the middle position, or said nozzle assembly receives the fluid from said source of pressurized fluid at the rearward position.

35. A method according to claim 22, wherein the fluid stream and the air stream exit the nozzle assembly in substantially the same direction.

36. A method according to claim 22, wherein the fluid stream is within the air stream.

37. A method according to claim 36, wherein the fluid stream and the air stream exit the nozzle assembly in substantially the same direction.

38. A system comprising:

a source of pressurized air;

a source of pressurized fluid containing ethylene glycol or propylene glycol;

a nozzle assembly that receives the pressurized air from said source of pressurized air and receives the pressurized fluid from said source of pressurized fluid, said nozzle assembly being configured to discharge the pressurized fluid and the pressurized air as first and second streams, respectively, wherein the first and second streams exit said nozzle assembly at substantially the same velocity and in substantially the same direction.

39. A method comprising:

introducing pressurized fluid containing ethylene glycol or propylene glycol into a nozzle assembly;

introducing pressurized air into the nozzle assembly;

wherein the fluid and air exit from the nozzle assembly to produce a fluid stream and an air stream, wherein the fluid stream and the air stream have substantially the same exit velocity from the nozzle assembly, and the fluid stream and the air stream exit in substantially the same direction from the nozzle assembly.

40. A system according to claim 1, wherein the first and second streams are coaxial.

41. A system according to claim 32, wherein the first and second streams are coaxial.

42. A system according to claim 31, wherein the first and second streams exit said nozzle assembly in the same direction.

43. A system according to claim 32, wherein the first and second streams exit said nozzle assembly in the same direction.

44. A method according to claim 22, wherein the fluid stream and the air stream are coaxial.

45. A method according to claim 36, wherein the fluid stream and the air stream are coaxial.

46. A method according to claim 35, wherein the fluid stream and the air stream exit the nozzle assembly in the same direction.

47. A method according to claim 36, wherein the fluid stream and the air stream exit the nozzle assembly in the same direction.

48. A system according to claim 1, wherein the first and second streams exit said nozzle assembly at about 600–800 mph.

49. A method according to claim 22, wherein the fluid stream and the air stream exit the nozzle assembly at about 600–800 mph.

50. A system according to claim 1, wherein the first and second streams exit said nozzle assembly at about sonic velocity.

51. A method according to claim 22, wherein the fluid stream and the air stream exit the nozzle assembly at about sonic velocity.

52. A system according to claim 1, wherein the first stream is surrounded by the second stream.

53. A method according to claim 22, wherein the fluid stream is surrounded by the air stream.

* * * * *